US012495784B2

(12) United States Patent
Schwalbe et al.

(10) Patent No.: US 12,495,784 B2
(45) Date of Patent: Dec. 16, 2025

(54) SYSTEM AND METHOD FOR CONTROLLING THE OPERATION OF AN AGRICULTURAL SPRAYER

(71) Applicant: CNH Industrial America LLC, New Holland, PA (US)

(72) Inventors: Blaine Schwalbe, Valders, WI (US); Karl Mark Luebke, New Holstein, WI (US); Steven Winkel, Elkhart Lake, WI (US)

(73) Assignee: CNH Industrial America LLC, New Holland, PA (US)

( * ) Notice: Subject to any disclaimer, the term of this patent is extended or adjusted under 35 U.S.C. 154(b) by 321 days.

(21) Appl. No.: 18/129,577

(22) Filed: Mar. 31, 2023

(65) Prior Publication Data

US 2024/0324578 A1 Oct. 3, 2024

(51) Int. Cl.
*A01M 7/00* (2006.01)

(52) U.S. Cl.
CPC ........ *A01M 7/0057* (2013.01); *A01M 7/0075* (2013.01); *A01M 7/0089* (2013.01)

(58) Field of Classification Search
None
See application file for complete search history.

(56) References Cited

U.S. PATENT DOCUMENTS

| | | | |
|---|---|---|---|
| 5,749,436 A | 5/1998 | Satchwell, III | |
| 6,068,277 A * | 5/2000 | Magnussen | B60R 3/02 182/127 |
| 9,821,715 B2 | 11/2017 | Matthiesen | |
| 11,293,148 B2 | 4/2022 | Repiscak et al. | |

(Continued)

FOREIGN PATENT DOCUMENTS

| | | |
|---|---|---|
| CN | 106828328 A | 6/2017 |
| CN | 109610805 A | 4/2019 |

(Continued)

OTHER PUBLICATIONS

Screen captures from YouTube video clip entitled "The Collapsible Walkway System," 8 pages, uploaded Aug. 5, 2011, by user Michael Christensen, Retrieved from Internet: https://www.youtube.com/watch?v=T2-jrgszHvo.

*Primary Examiner* — Isaac G Smith
*Assistant Examiner* — Jennifer M Anda
(74) *Attorney, Agent, or Firm* — Dority & Manning, P.A.

(57) ABSTRACT

An agricultural sprayer includes a chassis and a boom arm supported on the chassis, with the boom arm moveable relative to the chassis. Furthermore, the agricultural sprayer includes a plurality of nozzle assemblies supported on the boom arm, with the plurality of nozzle assemblies configured to dispense an agricultural fluid onto an underlying field. Additionally, the agricultural sprayer includes a cab supported on the chassis, a platform supported on the chassis and positioned outside of the cab, and a railing pivotably coupled to the platform. Moreover, the agricultural sprayer includes an actuator configured to pivot the railing relative to the platform. In addition, the agricultural sprayer includes a computing system configured to receive an input indicative of a position of the boom arm relative to the chassis and control an operation of the actuator based on the position of the boom arm relative to the chassis.

14 Claims, 8 Drawing Sheets

(56) References Cited

U.S. PATENT DOCUMENTS

| | | | |
|---|---|---|---|
| 2010/0038451 A1* | 2/2010 | Honermann | A01M 7/0075 239/302 |
| 2013/0084133 A1 | 4/2013 | Ade et al. | |
| 2015/0298613 A1 | 10/2015 | May | |
| 2016/0316739 A1* | 11/2016 | Brooks | A01B 76/00 |
| 2019/0352920 A1 | 11/2019 | Salyer | |
| 2021/0070223 A1* | 3/2021 | Oliver | B60R 3/005 |
| 2021/0178973 A1 | 6/2021 | Moen | |
| 2021/0221629 A1 | 7/2021 | Honeycutt | |
| 2021/0283642 A1* | 9/2021 | Smith | A01M 7/005 |
| 2021/0329905 A1* | 10/2021 | Hloben | A01M 7/0057 |
| 2021/0355695 A1 | 11/2021 | Lyras | |
| 2022/0025610 A1 | 1/2022 | Springer et al. | |
| 2022/0386588 A1* | 12/2022 | Dumont | A01C 23/008 |

FOREIGN PATENT DOCUMENTS

| | | |
|---|---|---|
| CN | 209022984 U | 6/2019 |
| CN | 110962719 A | 4/2020 |
| CN | 216007749 U | 3/2022 |
| DE | 29916556 U1 | 12/1999 |
| EP | 3517360 B1 | 1/2021 |
| EP | 3616997 B1 | 2/2021 |
| FR | 3112108 A1 | 1/2022 |

\* cited by examiner

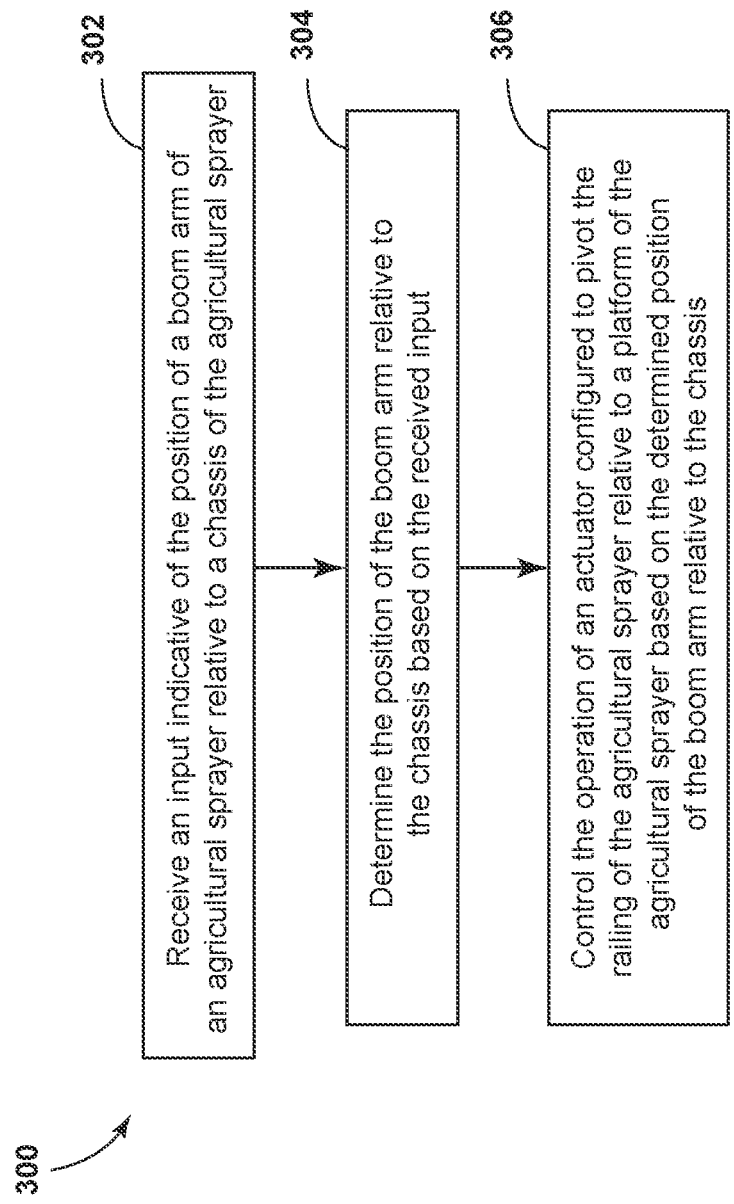

SYSTEM AND METHOD FOR CONTROLLING THE OPERATION OF AN AGRICULTURAL SPRAYER

FIELD OF THE INVENTION

The present disclosure generally relates to agricultural sprayers and, more particularly, to systems and methods for controlling the operation of an agricultural sprayer.

BACKGROUND OF THE INVENTION

Agricultural sprayers apply an agricultural fluid (e.g., a pesticide, a nutrient, and/or the like) onto an underlying field as the sprayer travels across the field. In general, the agricultural fluid is applied at a target application rate to achieve a desired agricultural outcome (e.g., a reduction in weed coverage or insect activity). As such, a typical sprayer includes a boom assembly having one or more boom arms on which a plurality of spaced apart nozzle assemblies is mounted. Each nozzle assembly is, in turn, configured to dispense or otherwise spray the agricultural fluid onto the underlying field at the target application rate.

Over the years, the lengths of boom assemblies have grown dramatically. For example, some current agricultural sprayers have boom assemblies that are 120 feet in length. As such, to facilitate road travel of the agricultural sprayer, the boom arm(s) of a typical boom assembly are movable between an unfolded position and a folded position. Specifically, when at the unfolded position, the boom arm(s) is extended to its maximum lateral width such that the nozzle assemblies are positioned to dispense the agricultural fluid across a lateral swath of the field. Conversely, when at the folded position, the boom arm(s) is collapsed to its minimum lateral width to facilitate road travel of the sprayer. However, other components of the sprayer may make it difficult to move the boom arm(s) fully into the folded position.

Accordingly, an improved system and method for controlling the operation of an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer including a chassis and a boom arm supported on the chassis, with the boom arm moveable relative to the chassis. Furthermore, the agricultural sprayer includes a plurality of nozzle assemblies supported on the boom arm, with the plurality of nozzle assemblies configured to dispense an agricultural fluid onto an underlying field. Additionally, the agricultural sprayer includes a cab supported on the chassis, a platform supported on the chassis and positioned outside of the cab, and a railing pivotably coupled to the platform. Moreover, the agricultural sprayer includes an actuator configured to pivot the railing relative to the platform. In addition, the agricultural sprayer includes a computing system configured to receive an input indicative of a position of the boom arm relative to the chassis and control an operation of the actuator based on the position of the boom arm relative to the chassis.

In another aspect, the present subject matter is directed to a system for controlling an operation of an agricultural sprayer. The system includes a boom arm moveable relative to a chassis of the agricultural sprayer and a plurality of nozzle assemblies supported on the boom arm, with the plurality of nozzle assemblies configured to dispense an agricultural fluid onto an underlying field. In addition, the system includes a cab, a platform positioned outside of the cab, and a railing pivotably coupled to the platform. Furthermore, the system includes an actuator configured to pivot the railing relative to the platform. Additionally, the system includes a computing system configured to receive an input indicative of a position of the boom arm relative to the chassis and control an operation of the actuator based on the position of the boom arm relative to the chassis.

In a further aspect, the present subject matter is directed to a method for controlling an operation of an agricultural sprayer. The agricultural sprayer, in turn, includes a boom arm and a plurality of nozzle assemblies supported on the boom arm. Moreover, the agricultural sprayer further includes a platform and a railing pivotably coupled to the platform. In this respect, the method includes receiving, with a computing system, an input indicative of a position of the boom arm relative to a chassis of the agricultural sprayer. In addition, the method includes determining, with the computing system, the position of the boom arm relative to the chassis based on the received input. Furthermore, the method includes controlling, with the computing system, an operation of an actuator configured to pivot the railing relative to the platform based on the determined position of the boom arm relative to the chassis.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 8 illustrates a flow diagram of one embodiment of a method for controlling the operation of an agricultural sprayer in accordance with aspects of the present subject matter.

Figure 1:
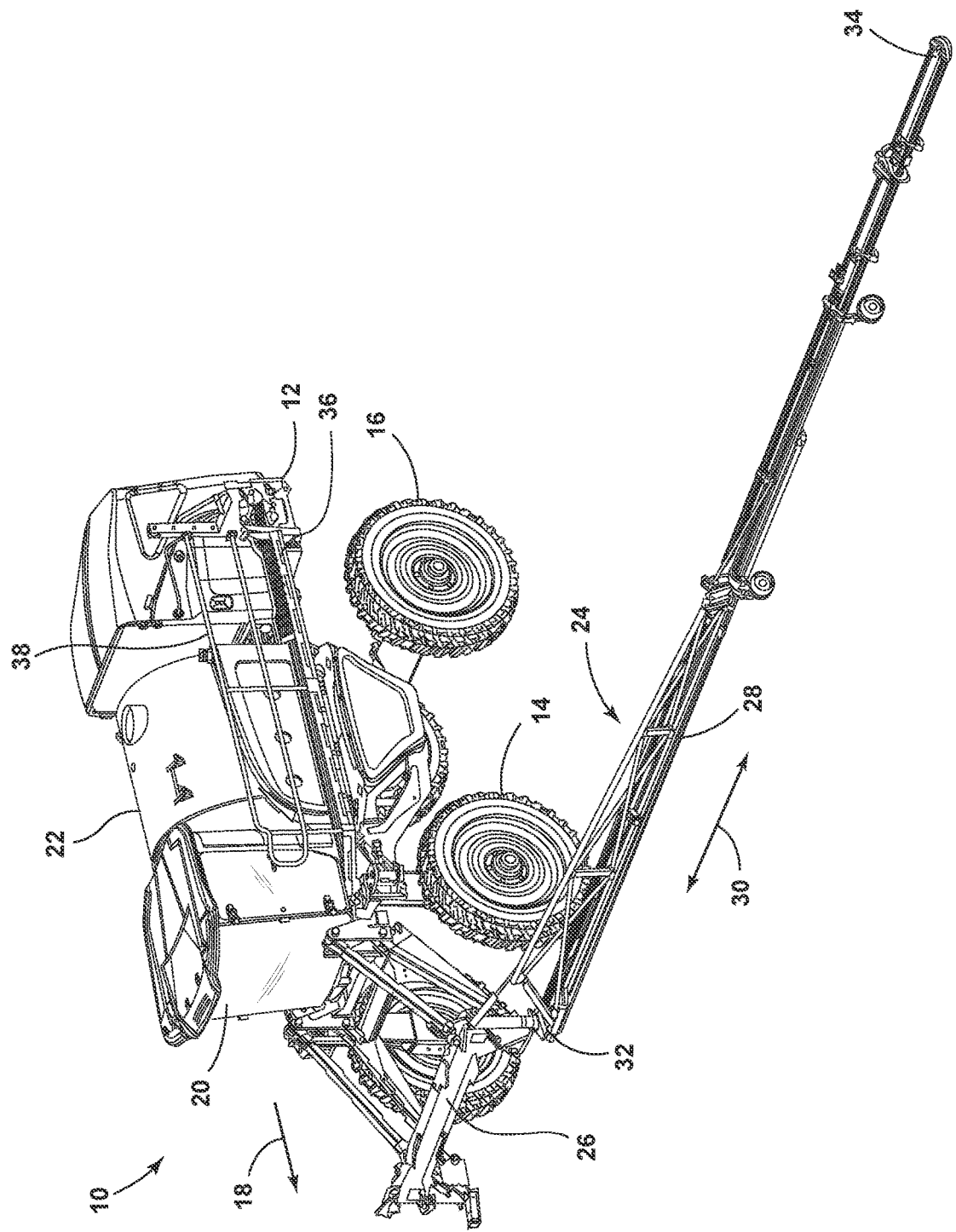
FIG. 1 illustrates a perspective view of one embodiment of an agricultural sprayer in accordance with aspects of the present subject matter, particularly illustrating a boom arm of the agricultural sprayer positioned at an unfolded position.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of an agricultural sprayer. As will be described below, the agricultural sprayer includes a boom assembly having one or more boom arms on which a plurality of nozzle assemblies is supported. The boom arm(s) is, in turn, movable relative to a chassis of the sprayer, such as between an unfolded position and a folded position. Specifically, when the boom arm(s) is at its unfolded position, the boom arm(s) is extended to its maximum lateral width such that the nozzle assemblies are positioned to dispense an agricultural fluid (e.g., a pesticide) across a lateral swath of the field. Conversely, when the boom arm(s) is at its folded position, the boom arm(s) is collapsed to its minimum lateral width to facilitate road travel of the sprayer. Furthermore, the sprayer includes a cab, a platform positioned outside of the cab, and a railing pivotably coupled to the platform. In this respect, the platform and railing support the operator when he or she is entering and exiting the cab and/or checking other components of sprayer (e.g., the tank in which the agricultural fluid is stored, the engine, etc.).

In several embodiments, the system includes one or more actuators configured to pivot the railing relative to the platform, such as between an operational position and a stowed position. Specifically, when the railing is at its operational position, the railing is pivoted outward relative to the platform to provide clearance for the operator to walk or otherwise move on the platform. Conversely, when the railing is at its stowed position, the railing is pivoted inward relative to the platform to provide clearance for the boom arm(s) when in at the folded position. The operator generally cannot easily walk on the platform when the railing is at the stowed position.

Additionally, a computing system of the disclosed system is configured to adjust the position of railing relative to the platform based on the position of the boom arm(s). More specifically, in several embodiments, the computing system is configured to receive an input indicative of the position(s) of the boom arm(s) relative to the sprayer chassis. In one embodiment, the input may be received from a sensor(s). Alternatively, the input may be received from a user interface, such as a switch or lever within the cab that the operator interacts with to move the boom arm(s) between the unfolded and folded positions. Thereafter, the computing system is configured to control the operation of the actuator(s) based on the position(s) of the boom arm(s) relative to the sprayer chassis. For example, in some embodiments, the computing system may control the operation of the actuator(s) such that the railing is moved to the operational position when the boom arm is being moved to the unfolded position and the railing is moved to the stowed position when the boom arm is being moved to the folded position.

Adjusting the position of the railing of an agricultural sprayer relative to the platform of the sprayer improves the operation of the sprayer. More specifically, when the railing is at its operational position such that the operator can walk along the platform, one of the boom arms may contact the railing when at the folded position. To prevent such contact, the operator must manually move the railing to the stowed position before the boom arm(s) can be moved to the folded position. Should the operator forget to move the railing to stowed position before moving the boom arm(s) to the folded position, the boom assembly and/or the railing may be damaged. Furthermore, manual adjustment of the railing position requires the presence of the operator, which make such a configuration unsuitable for an autonomous sprayer. However, as described above, the disclosed system and method automatically move the railing between the operational and stowed positions based on the position of the boom arm(s). Thus, with the disclosed system and method, the boom arm(s) can be moved to the folded position without damaging the railing and/or the boom assembly or requiring the operator to remember to move the railing to the stowed position beforehand.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural substance (e.g., a pesticide or a nutrient) while traveling across a field, such as an agricultural tractor and an associated implement (e.g., a towable sprayer, an inter-seeder, a side-dresser, and/or the like).

As shown in FIG. 1, the agricultural sprayer 10 includes a chassis 12 configured to support or couple to a plurality of components. For example, a pair of steerable front wheels 14 and a pair of driven rear wheels 16 may be coupled to the chassis 12. The wheels 14, 16 may be configured to support the agricultural sprayer 10 relative to the ground and move the agricultural sprayer 10 in a travel direction 18 across the field. Furthermore, the chassis 12 may support a cab 20 and an agricultural fluid tank 22 configured to store or hold an agricultural substance, such as a pesticide (e.g., a herbicide, an insecticide, a rodenticide, and/or the like), a fertilizer, or a nutrient. However, in alternative embodiments, the agricultural sprayer 10 may have any other suitable configuration. For example, in one embodiment, the front wheels 14 of the agricultural sprayer 10 may be driven in addition to or in lieu of the rear wheels 16.

Additionally, the agricultural sprayer 10 may include a boom assembly 24 mounted or otherwise supported on the chassis 12. Specifically, in several embodiments, the boom assembly 24 may include a frame 26 coupled to the chassis 12 and a pair of boom arms 28 (one is shown) coupled to the frame 26. In this respect, each boom arm 28 extends outwardly in a lateral direction 30 from an inner lateral end 32 that is coupled to the frame 26 to an opposing outer lateral end 34. The lateral direction 30, in turn, extends perpendicular to the travel direction 18 of the agricultural sprayer 10. As will be described below, a plurality of nozzle assemblies 39 (FIG. 3) are supported on the boom assembly 24. Each nozzle assembly 39 is, in turn, be configured to dispense the agricultural substance stored in the tank 22 onto the underlying field (e.g., the underlying field/soil surface and/or the underlying crop canopy). However, in alternative embodiments, the boom assembly 24 may have any other suitable configuration.

In general, the boom arms 28 are moveable relative to the chassis 12 such that the boom assembly 24 is foldable. In several embodiments, the boom arms 28 are pivotably coupled to the frame 26. As such, the boom arms 28 can be pivoted relative to the frame 26 (e.g., via suitable hydraulic, pneumatic, or electric actuators) between an unfolded position shown in FIG. 1 and a folded position shown in FIG. 2. More specifically, when at the unfolded position, the boom arms 24 extend outward from the chassis 12 and frame 26 to their maximum width in the lateral direction 30. That is, the boom arms 28 are generally oriented perpendicular to the travel direction 18 when at the unfolded position. Thus, when unfolded, the boom assembly 24 is configured to allow the nozzle assemblies 39 (FIG. 3) positioned along the boom arms 28 to dispense the agricultural fluid from the tank 22 across a lateral swath of the field as the agricultural sprayer 10 travels across the field. Conversely, when at the folded position, the boom arms 24 extend outward from the chassis 12 and frame 26 to their minimum width in the lateral direction 30, such as for road travel. That is, when at the folded position, the boom arms 28 are generally folded up such that their outer lateral ends 34 are positioned much closer to the chassis 12 than when at the unfolded position. Thus, when folded, the boom assembly 24 is not configured to allow the nozzle assemblies 39 (FIG. 3) positioned along the boom arms 28 to dispense the agricultural fluid from the tank 22 onto the underlying field.

Additionally, the agricultural sprayer 10 includes the platform 36 supported on the chassis 12 positioned adjacent to but outside of the cab 20. In general, the platform 36 is a structure coupled (e.g., fixedly coupled) to the chassis 12 upon which the operator can walk or otherwise move around on. As such, the platform 36 provides a surface that is positioned at the general height of the cab 20 above the field surface in a vertical direction. For example, in several embodiments, the platform 36 may be positioned above the wheels 14, 16 in the vertical direction. In this respect, before operation of the agricultural sprayer 10, the operator may climb a ladder (not shown) up to the platform 36. Once present on the platform 36, the operator may enter the cab 20, check the contents of the tank 22, check or service an engine (not shown) of the agricultural sprayer 10, and/or the like. Similarly, after operation, the operator may exit the cab 20 onto the platform 36. Thereafter, the operator may climb down the ladder (not shown) to the field surface.

The platform 36 may have any suitable configuration that allows the platform 36 to support the operator outside of the cab 20 and at a position above the field surface in the vertical direction. For example, in some embodiments, the platform 36 may be configured as an assembly or weldment of beams, bars, plates, sheet material (e.g., sheet metal), grates, and/or the like.

Moreover, the agricultural sprayer 10 includes a railing 38 positioned outside of the cab 20 and pivotably coupled to the platform 36. In general, the railing 38 is positioned adjacent to the outer edge of the platform 36 in the lateral direction 30 and extends upward from the platform 36 in the vertical direction. For example, the platform 36 may be at least partially positioned between the cab 20 and the railing 38 in the lateral direction 30. As such, the railing 38 forms a barrier at the outer edge of the platform 36 that the operator can grasp or use for support while traversing the platform 36.

The railing 38 may have any suitable configuration that allows the railing 38 to form a barrier the outer edge of the platform 36 that the operator can grasp. For example, in some embodiments, the railing 38 may be configured as an assembly or weldment of beams, bars, tubes, pipes, and/or the like.

Figure 3:
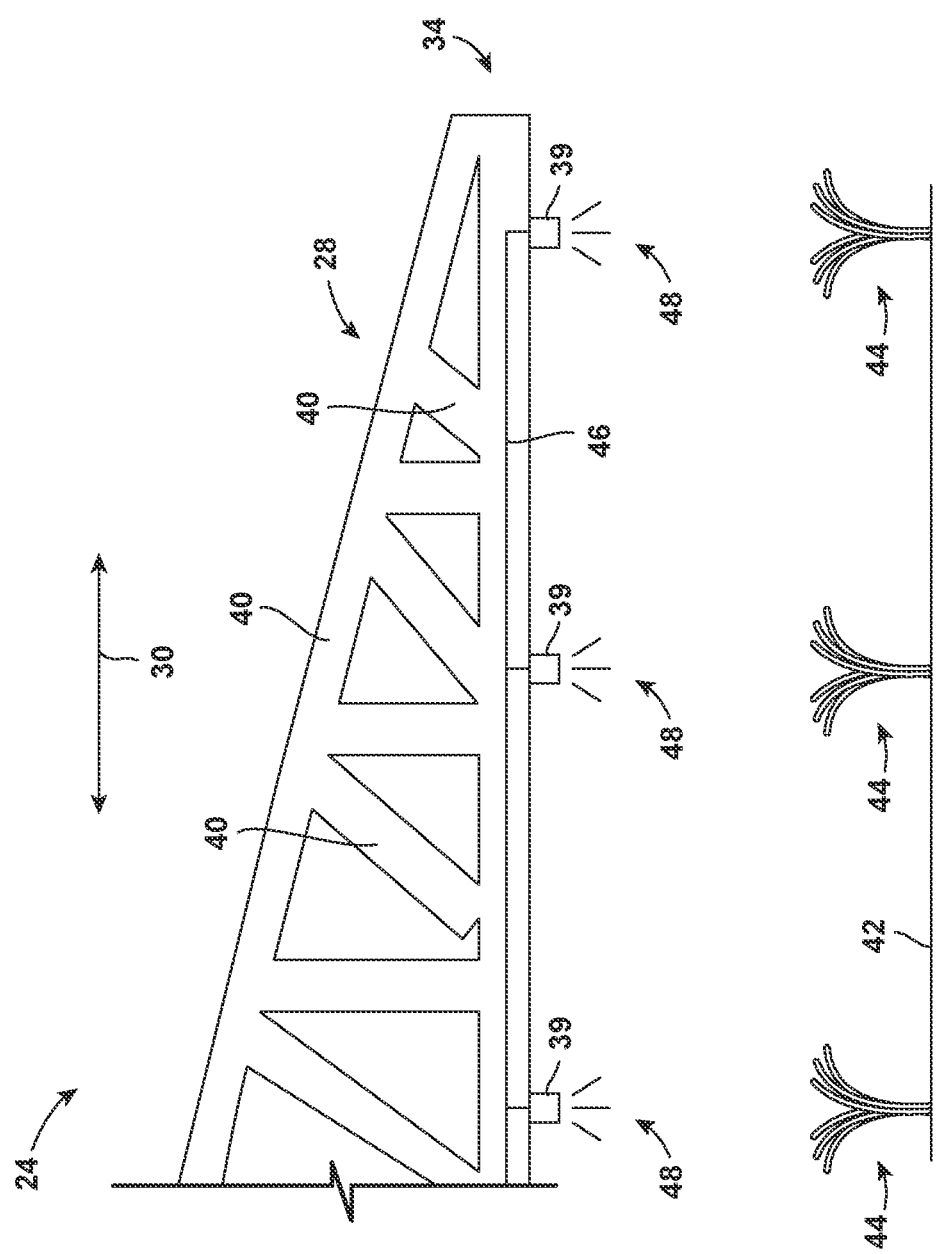
FIG. 3 illustrates a partial front view of one embodiment of a boom arm of an agricultural sprayer in accordance with aspects of the present subject matter, particularly illustrating a plurality of nozzle assemblies supported on the boom arm.

Referring now to FIG. 3, a partial front view of one embodiment of a boom assembly 24 is illustrated in accordance with aspects of the present subject matter. In general, the boom assembly 24 may include a plurality of structural frame members 40, such as beams, bars, and/or the like. Moreover, as mentioned above, the boom assembly 24 may support a plurality of nozzle assemblies 39 (also referred to as spray tips). Each nozzle assembly 39 may, in turn, be configured to dispense the agricultural fluid stored within the tank 22 (FIG. 1) onto the underlying field surface 42 and/or plants 44. Specifically, as shown, the nozzle assemblies 39 are mounted on and/or coupled to the frame members 40 such that the nozzle assemblies 39 are spaced apart from each other in the lateral direction 30. Furthermore, fluid conduit(s) 46 may fluidly couple the nozzle assemblies 39 to the tank 22 and an associated pump (not shown). In this respect, as the agricultural sprayer 10 travels across the field in the travel direction 18 to perform a spraying operation thereon, the pump may pump the agricultural fluid from the tank 22 through the fluid conduit(s) 46 to each of the nozzle assemblies 39. The nozzle assemblies 39 may, in turn, dispense or otherwise spray a fan 48 of the agricultural fluid onto the underlying field surface 42 and/or plants 44.

Figure 4:
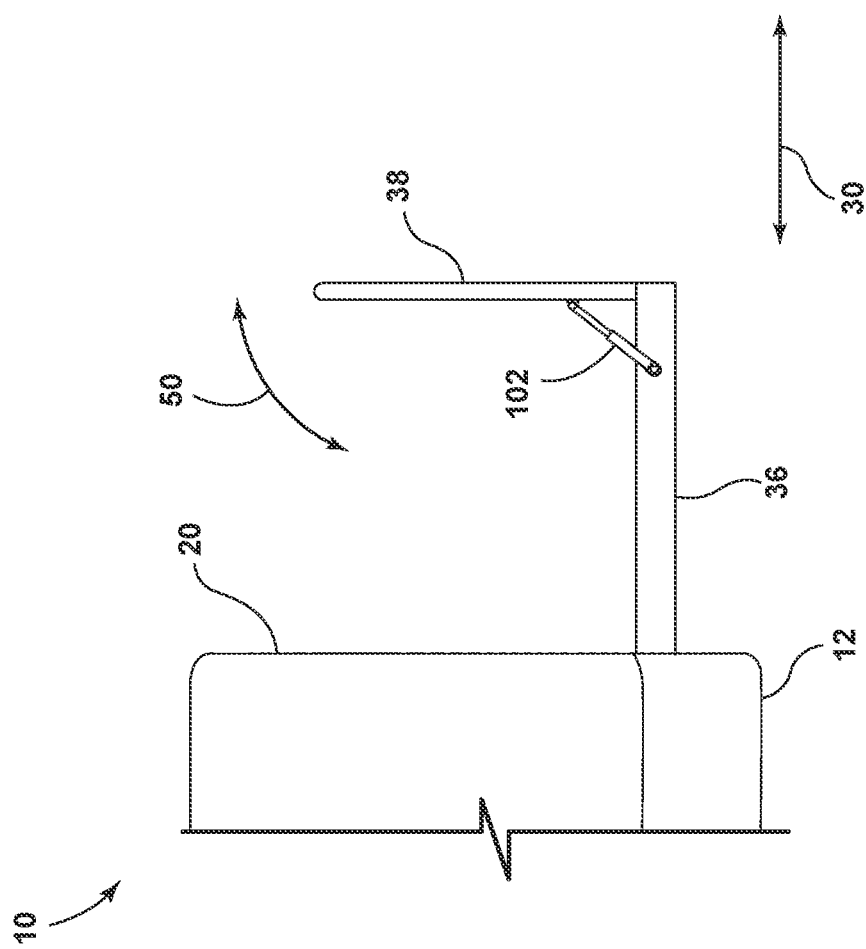
FIG. 4 illustrates a front view of one embodiment of a platform and a railing of an agricultural sprayer in accordance with aspects of the present subject matter, particularly illustrating the railing positioned at an operational position relative to the platform.
Figure 5:
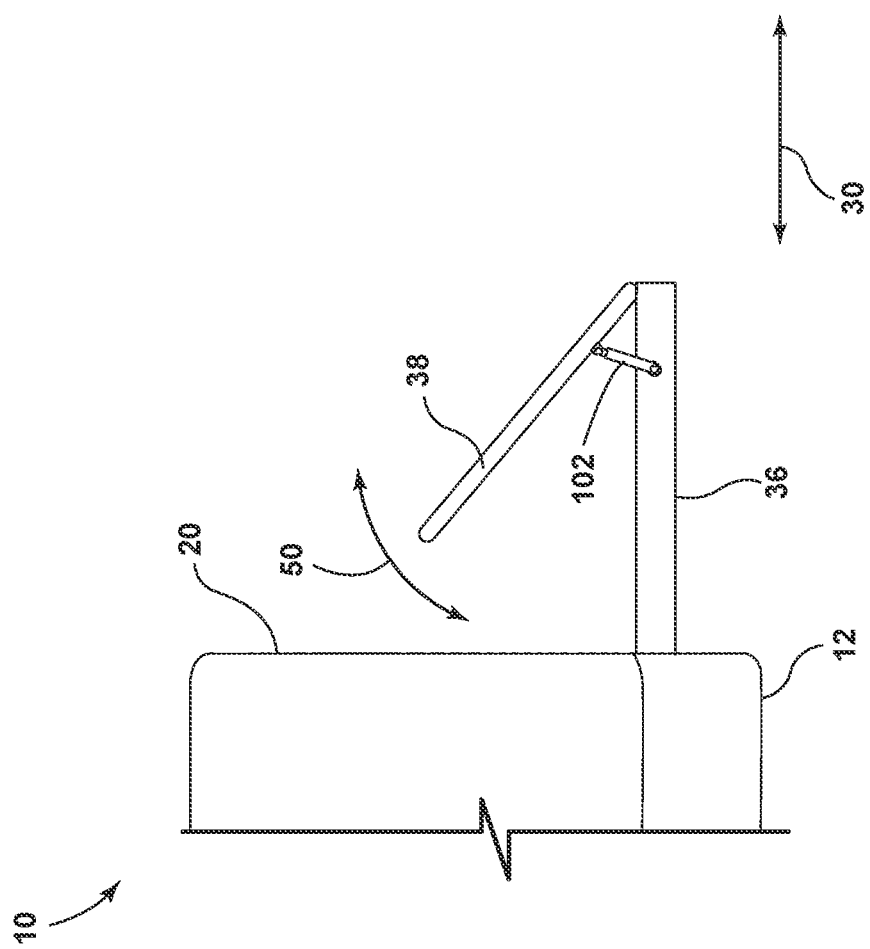
FIG. 5 illustrates another front view of the platform and the railing of the agricultural sprayer shown in FIG. 4, particularly illustrating the railing positioned at a stowed position relative to the platform.

Referring now to FIGS. 4 and 5, differing front views of the platform 36 and the railing 38 are illustrated. More specifically, FIG. 4 illustrates the platform 36 and the railing 38 when the railing 38 is at the operational position. Furthermore, FIG. 5 illustrates the platform 36 and the railing 38 when the railing 38 is at the stowed position.

As mentioned above, the railing 38 is pivotably coupled to the platform 36. In this respect, the railing 38 is pivotable relative to the platform 36 (e.g., as indicated by arrows 50), such as between the operational position shown in FIG. 4 and the stowed position shown in FIG. 5. More specifically, when at the operational position, the railing 38 is positioned relative to the platform 36 such that the operator can walk along the platform 36. For example, in one embodiment, the railing 38 may be oriented at a right angle relative to the platform 36 when at the operational position. Conversely, when at the stowed position, the top edge of the railing 38 is pivoted inward along the lateral direction 30 toward the cab 20 to provide clearance for one of the boom arms 28 when that boom arm 28 is at the folded position. As such, it may be difficult for the operator to move along the platform 36 when the railing 38 is at the stowed position.

It should be further appreciated that the configuration of the agricultural sprayer 10 described above and shown in FIGS. 1-5 is provided only to place the present subject matter in an exemplary field of use. Thus, it should be appreciated that the present subject matter may be readily adaptable to any manner of vehicle configuration.

Additionally, the agricultural sprayer 10 includes one or more actuators 102. In general, the actuator(s) 102 is configured to pivot the railing 38 relative to the platform 36, such as between the operational and stowed positions. Thus, in some embodiments, the actuator(s) 102 may be coupled between the railing 38 and the platform 36. As will be described below, the operation of the actuator(s) 102 may be controlled based on the positions of the boom arms 28 of the agricultural sprayer 10.

The actuator(s) 102 may have any suitable configuration that allows actuator(s) 102 to pivot the railing 38 relative to the platform 36. For example, the actuator(s) 102 may be configured as a hydraulic cylinder(s), a pneumatic cylinder(s), an electric linear actuator(s), an electric motor(s), and/or the like. Moreover, although FIGS. 4 and 5 illustrate a single actuator 102, the agricultural sprayer 10 may have any other suitable number of actuator(s) 102, such as two or more actuator(s) 102.

In some embodiments, the railing 38 is biased toward one of the operational or stowed positions, such as via a spring, a pneumatic cylinder, or other biasing element (not shown). For example, in one embodiment, the railing 38 may be biased toward the operational position. In such an embodiment, when activated, the actuator(s) 102 may overcome the biasing force to pivot the railing 38 to the stowed position. Conversely, in another embodiment, the railing 38 may be biased toward the stowed position. In such an embodiment, when activated, the actuator(s) 102 may overcome the biasing force to pivot the railing 38 to the operational position. However, in alternative embodiments, the railing 38 may not be biased to one of the operational or stowed positions.

Figure 6:
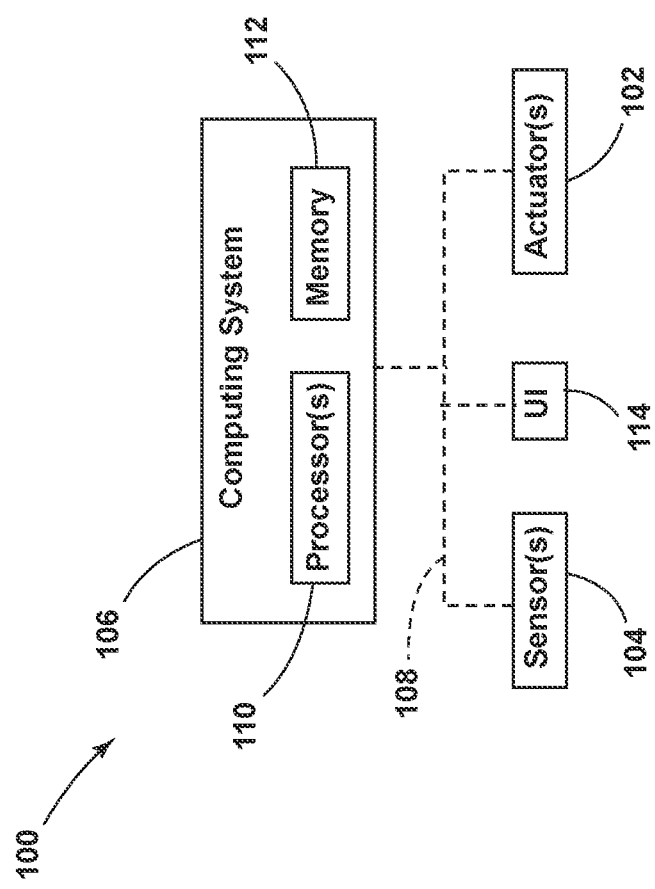
FIG. 6 illustrates a schematic view of one embodiment of a system for controlling the operation of an agricultural sprayer in accordance with aspects of the present subject matter.

Referring now to FIG. 6, a schematic view of one embodiment of a system 100 for controlling the operation of an agricultural sprayer is illustrated in accordance with aspects of the present subject matter. In general, the system 100 will be described herein with reference to the agricultural sprayer 10 described above with reference to FIGS. 1-5. However, it should be appreciated by those of ordinary skill in the art that the disclosed system 100 may generally be utilized with agricultural sprayers having any other suitable sprayer configuration.

As shown in FIG. 6, the system 100 includes one or more components of the agricultural sprayer 10. For example, the system 100 includes the actuator(s) 102 of the agricultural sprayer 10 that is configured to pivot the railing 38 relative to the platform 36.

Figure 2:
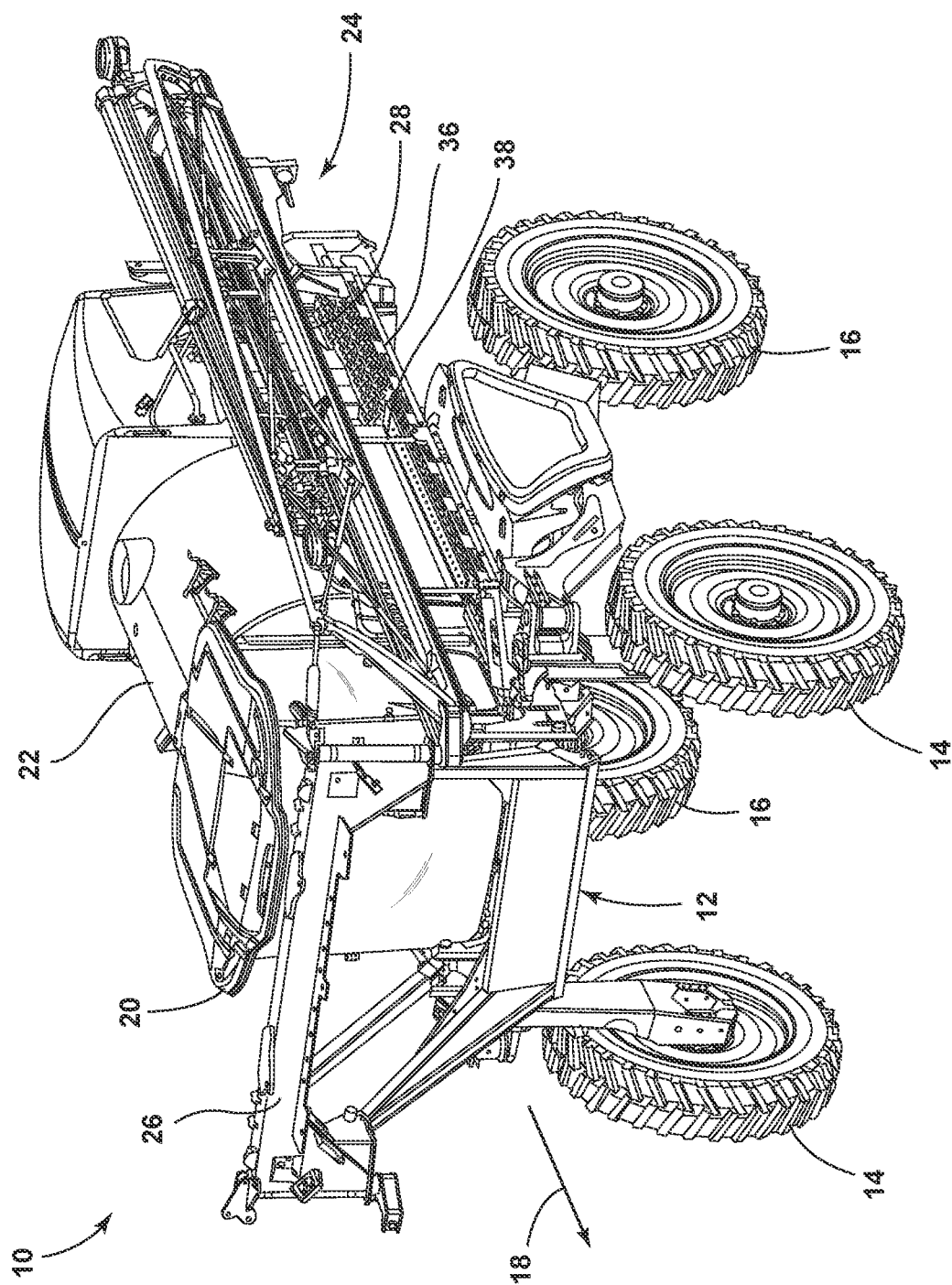
FIG. 2 illustrates another perspective view of the agricultural sprayer shown in FIG. 1, particularly illustrating the boom arm positioned at a folded position.

Furthermore, in several embodiments, the system 100 includes one or more sensors 104 of the agricultural sprayer 10. In general, the sensor(s) 104 is configured to generate data indicative of the positions of the boom arms 28 of the agricultural sprayer 10 relative to the frame 26 or the chassis 12. Based on the data generated by the sensor(s) 104, it can be determined whether the boom arms 28 are at the unfolded position (e.g., as shown in FIG. 1), at the folded position (e.g., as shown in FIG. 2), being moved from the folded position to the unfolded position, or being moved from the unfolded position to the folded position. As will be described below, this data is, in turn, used to control the operation of the actuator(s) 102.

The sensor(s) 104 may correspond to any suitable sensing device(s) configured to generate data indicative of the positions of the boom arms 28 relative to the chassis 12. For example, in one embodiment, the sensor(s) 104 may be configured as strain gauges coupled between the boom arms 28 and the frame 26. The strain gauges, in turn, which generate data indicative of the rotational position of the boom arms 28 relative to frame 26. In another embodiment, the sensor(s) 104 may be configured as contact-based sensors configured to detect when the boom arms 28 contact saddles (not shown) of the agricultural sprayer 10. However, in alternative embodiments, the sensor(s) 104 may have any other suitable configuration.

Moreover, the system 100 includes a computing system 106 communicatively coupled to one or more components of the agricultural sprayer 10 and/or the system 100 to allow the operation of such components to be electronically or automatically controlled by the computing system 106. For instance, the computing system 106 may be communicatively coupled to the sensor(s) 104 via a communicative link 108. As such, the computing system 106 may be configured to receive data from the sensor(s) 104 that is indicative of the positions of the boom arms 28 relative to the chassis 12. Furthermore, the computing system 106 may be communicatively coupled to the actuator(s) 102 via the communicative link 108. In this respect, the computing system 106 may be configured to control the operation of the actuator(s) 102 to pivot the railing 38 relative to the platform 36, such as between the operational position (e.g., as shown in FIG. 4) and the stowed position (e.g., as shown in FIG. 5). In addition, the computing system 106 may be communicatively coupled to any other suitable components of the agricultural sprayer 10 and/or the system 100.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance such devices may be considered to form part of the computing system 106. For instance, the functions of the computing system 106 may be distributed across multiple application-specific controllers or computing devices, such as a spray controller, a pump controller, a navigation controller, an engine controller, a transmission controller, and/or the like.

Furthermore, the system 100 may also include a user interface 114. More specifically, the user interface 114 may be configured to receive inputs (e.g., inputs associated with the positions of the boom arms 28) from the operator. As such, the user interface 114 may include one or more input devices, such as touchscreens, keypads, touchpads, knobs, buttons, sliders, switches, mice, microphones, and/or the like, which are configured to receive inputs from the operator. The user interface 114 may, in turn, be communicatively coupled to the computing system 106 via the communicative link 108 to permit the received inputs to be transmitted from the user interface 114 to the computing system 106. In addition, some embodiments of the user interface 114 may include one or more feedback devices (not shown), such as display screens, speakers, warning lights, and/or the like, which are configured to provide feedback from the computing system 106 to the operator. In one embodiment, the user interface 114 may be mounted or otherwise positioned within the cab 20 of the agricultural sprayer 10. However, in alternative embodiments, the user interface 114 may mounted at any other suitable location.

Figure 7:
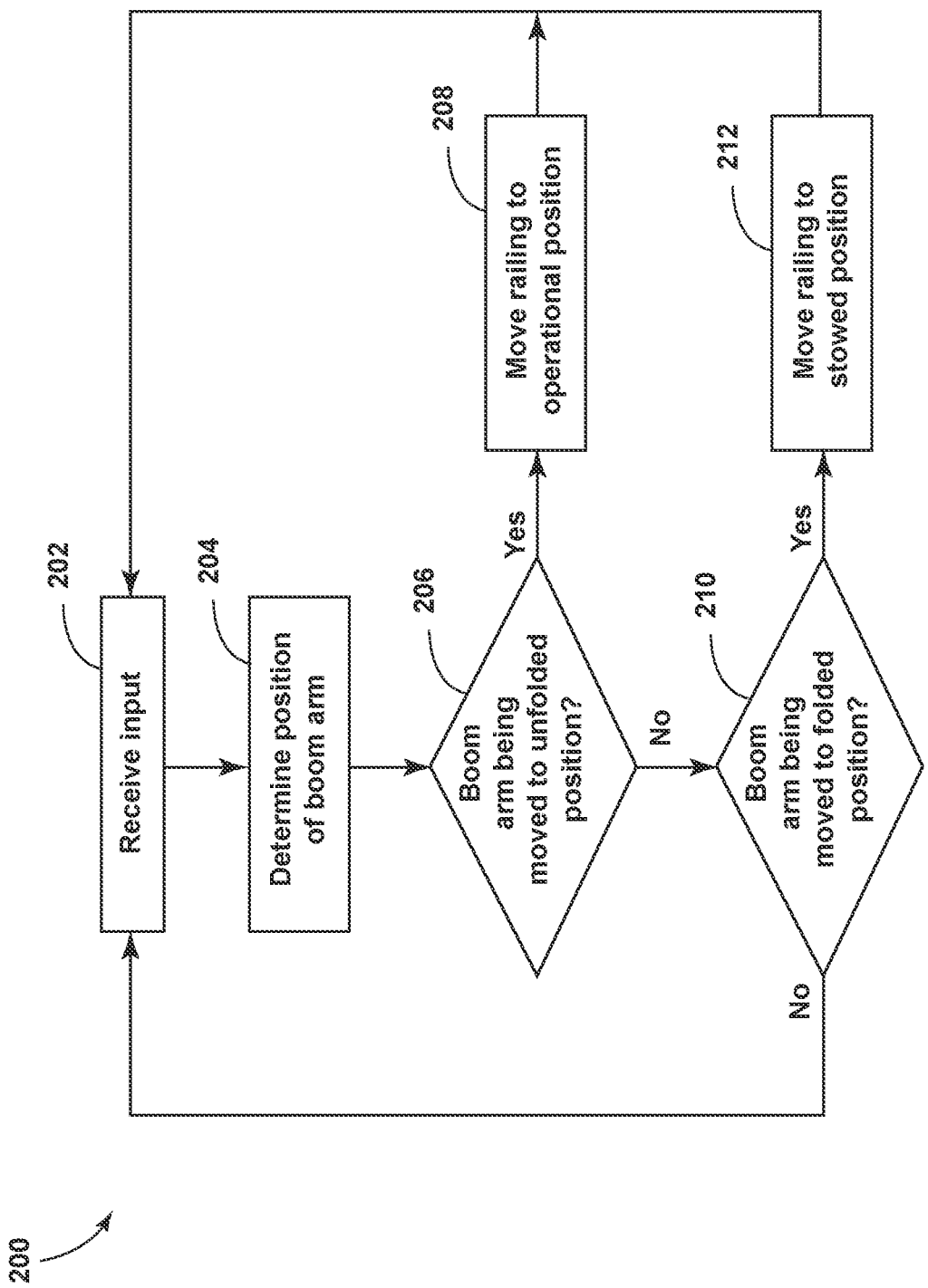
FIG. 7 illustrates a flow diagram of one embodiment of control logic for controlling the operation of an agricultural sprayer in accordance with aspects of the present subject matter.

Referring now to FIG. 7, a flow diagram of one embodiment of control logic 200 that may be executed by the computing system 106 (or any other suitable computing system) for controlling the operation of an agricultural sprayer is illustrated in accordance with aspects of the present subject matter. Specifically, the control logic 200 shown in FIG. 7 is representative of steps of one embodiment of an algorithm that can be executed to control the operation of an agricultural sprayer to allow for automatic adjustment of a railing of the sprayer relative to a platform of the sprayer based on the position of a boom arm(s) of the sprayer. Thus, in several embodiments, the control logic 200 may be advantageously utilized in association with a system installed on or forming part of an agricultural sprayer to allow for real-time control of the operation of the sprayer without requiring substantial computing resources and/or processing time. However, in other embodiments, the control logic 200 may be used in association with any other suitable system, application, and/or the like for controlling the operation of an agricultural sprayer.

As shown, at (202) the control logic 200 includes receiving an input indicative of the position of a boom arm of the agricultural sprayer relative to a chassis of the sprayer. Specifically, in several embodiments, during the operation of the agricultural sprayer 10, the computing system 106 is configured to receive an input via the communicative link 108. The received input is, in turn, indicative of the positions of the boom arms 28 relative to the chassis 12.

In some embodiments, at (202), the control logic 200 includes receiving the input indicative of the position of the boom arm relative to the chassis from one or more sensors. Specifically, as mentioned above, in particular embodiments, the computing system 106 may be communicatively coupled to the sensor(s) 104 via the communicative link 108. In this respect, during operation of the agricultural sprayer 10, the computing system 106 may receive data from the sensor(s) 104 that is indicative of the positions of the boom arms 28 relative to the chassis 12. For example, the received input is indicative of whether the boom arms 28 are being moved to the unfolded position (e.g., as shown in FIG. 1) or the folded position (e.g., as shown in FIG. 2)

In other embodiments, as (202), the control logic 200 includes receiving the input indicative of the position of the boom arm relative to the chassis from a user interface or other operator input device. Specifically, as mentioned above, in some embodiments, the computing system 106 may be communicatively coupled to the user interface 114 via the communicative link 108. In this respect, the operator may provide one or more inputs to the user interface 114, with such input(s) being indicative of the operator's desire to move the boom assembly 24 from the unfolded position (e.g., as shown in FIG. 1) to the folded position (e.g., as shown in FIG. 2) or from the folded position (e.g., as shown in FIG. 2) to the unfolded position (e.g., as shown in FIG. 1). Thereafter, the operator input(s) may be transmitted from the user interface 114 to the computing system 106 via the communicative link 108. Alternatively, the computing system 106 may receive the input in any other suitable manner.

Furthermore, at (204), the control logic 200 includes determining the position of the boom arm relative to the chassis based on the received input. Specifically, in several embodiments, the computing system 106 may be configured to determine the positions of the boom arms 28 relative to the chassis 12 based on the input received at (202). For example, in one embodiment, the computing system 106 access a look-up table stored within its memory device(s) 112 that correlates the input received at (202) (e.g., the received sensor data) to the positions of the boom arms 28 relative to the chassis 12. As will be described below, the computing system 106 is configured to control the operation of the actuator(s) 102 configured to pivot the railing 38 relative to the platform 36 based on the determined positions of the boom arms 28 relative to the chassis 12.

Additionally, at (206), the control logic 200 includes determining whether the boom arm is being moved to the unfolded position. Specifically, in several embodiments, the computing system 106 may be configured to determine whether the boom arms 28 are being moved to the unfolded position (e.g., as shown in FIG. 1) based on the position (or a series of positions) determined at (204). When it is determined that the boom arms 28 are being moved to the unfolded position, the control logic 200 proceeds to (208). Conversely, when it is determined that the boom arms 28 are not being moved to the unfolded position, the control logic 200 proceeds to (210).

Moreover, at (208), the control logic 200 includes controlling the operation of an actuator of the agricultural sprayer such that a railing of the sprayer is moved to the operational position. More specifically, when it is determined at (206) that the boom arms 28 are being moved to the unfolded position, the clearance for the boom arms 28 that is created by moving the railing 38 to the stowed position (e.g., as shown in FIG. 5) is not needed. In such instances, the computing system 106 may be configured to transmit control signals to the actuator(s) 102 of the agricultural sprayer 10. The control signals, in turn, instruct the actuator(s) 102 to pivot the railing 38 relative to the platform 36 such that the railing 38 is positioned at the operational position (e.g., as shown in FIG. 4). Thus, once the railing 38 is moved to the operational position, the operator can easily walk along or otherwise traverse the platform 36, such as to enter or exit the cab 20, check the contents of the tank 22, and/or the like. Upon completion of (208), the control logic 200 returns (202).

In addition, at (210), the control logic 200 includes determining whether the boom arm is being moved to the folded position. Specifically, in several embodiments, the computing system 106 may be configured to determine whether the boom arms 28 are being moved to the folded position (e.g., as shown in FIG. 2) based on the position (or a series of positions) determined at (204). When it is determined that the boom arms 28 are being moved to the folded position, the control logic 200 proceeds to (212). Conversely, when it is determined that the boom arms 28 are not being moved to the unfolded position and not being moved to the folded position (e.g., at (206)), the control logic 200 returns to (202).

Furthermore, at (212), the control logic 200 includes controlling the operation of the actuator such that the railing is moved to the stowed position. More specifically, when it is determined at (210) that the boom arms 28 are being moved to the folded position, the clearance for the boom arms 28 that is created by moving the railing 38 to the stowed position is needed to accommodate the folding of the boom assembly 24. In such instances, the computing system 106 may be configured to transmit control signals to the actuator(s) 102 of the agricultural sprayer 10. The control signals, in turn, instruct the actuator(s) 102 to pivot the railing 38 relative to the platform 36 such that the railing 38 is positioned at the stowed position. Thus, once the railing 38 is moved to the stowed position, clearance for moving the boom arms 28 to the folded position is available. Upon completion of (212), the control logic 200 returns (202).

Referring now to FIG. 8, a flow diagram of one embodiment of a method 300 for controlling the operation of an agricultural sprayer is illustrated in accordance with aspects of the present subject matter. In general, the method 300 will be described herein with reference to the agricultural sprayer 10 and the system 100 described above with reference to FIGS. 1-7. However, it should be appreciated by those of ordinary skill in the art that the disclosed method 300 may generally be implemented with any agricultural sprayer having any suitable sprayer configuration and/or within any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (302), the method 300 includes receiving, with a computing system, an input indicative of the position of a boom arm of an agricultural sprayer relative to a chassis of the agricultural sprayer. For instance, as described above, the computing system 106 may be configured to receive an input indicative of the positions of the boom arms 28 relative to the chassis 12. The computing system 106 may, in turn, receive the input from the sensor(s) 104 or the user interface 114.

Furthermore, at (304), the method 300 includes determining, with the computing system, the position of the boom arm relative to the chassis based on the received input. For instance, as described above, the computing system 106 may be configured to determine the positions of the boom arms 28 relative to the chassis 12 based on the received input.

Additionally, at (306), the method 300 includes controlling, with the computing system, the operation of an actuator configured to pivot a railing of the agricultural sprayer relative to a platform of the agricultural sprayer based on the determined position of the boom arm relative to the chassis. For instance, as described above, the computing system 106 may be configured to control the operation of the actuator(s) 102, which is configured to pivot the railing 38 relative to the platform 36, based on the determined positions of the boom arms 28 relative to the chassis 12.

It is to be understood that the steps of the control logic 200 and the method 300 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 300, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system 106 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:
   a chassis;
   a boom arm supported on the chassis, the boom arm moveable relative to the chassis;
   a plurality of nozzle assemblies supported on the boom arm, the plurality of nozzle assemblies configured to dispense an agricultural fluid onto an underlying field;
   a cab supported on the chassis;
   a platform supported on the chassis and positioned outside of the cab;
   a railing pivotably coupled to the platform;
   an actuator configured to pivot the railing relative to the platform;
   a sensor configured to generate data indicative of a position of the boom arm relative to the chassis; and
   a computing system communicatively coupled to the sensor, the computing system configured to:
      determine the position of the boom arm relative to the chassis based on data generated by the sensor; and
      control an operation of the actuator based on the position of the boom arm relative to the chassis.

2. The agricultural sprayer of claim 1, wherein:
   the boom arm is moveable relative to the chassis between an unfolded position and a folded position; and the data generated by the sensor is further indicative of whether the boom arm is being moved to the unfolded position or the folded position.

3. The agricultural sprayer of claim 2, wherein:
the railing is pivotable relative to the platform between an operational position and a stowed position; and
when controlling the operation of the actuator, the computing system is configured to control the operation of the actuator such that the railing is moved to the operational position when the boom arm is being moved to the unfolded position and the railing is moved to the stowed position when the boom arm is being moved to the folded position.

4. The agricultural sprayer of claim 1, further comprising:
a plurality of wheels coupled to the chassis,
wherein the platform is positioned above the plurality of wheels in a vertical direction.

5. The agricultural sprayer of claim 1, wherein:
the boom arm extends along a lateral direction from a first end of the boom arm to a second end of the boom arm, the lateral direction extending perpendicular to a travel direction of the agricultural sprayer; and
the platform is at least partially positioned between the cab and the railing in the lateral direction.

6. A system for controlling an operation of an agricultural sprayer, the system comprising:
a boom arm moveable relative to a chassis of the agricultural sprayer;
a plurality of nozzle assemblies supported on the boom arm, the plurality of nozzle assemblies configured to dispense an agricultural fluid onto an underlying field;
a cab;
a platform positioned outside of the cab;
a railing pivotably coupled to the platform;
an actuator configured to pivot the railing relative to the platform;
a sensor configured to generate data indicative of a position of the boom arm relative to the chassis; and
a computing system is communicatively coupled to the sensor, the computing system configured to:
determine the position of the boom arm relative to the chassis based on data generated by the sensor; and
control an operation of the actuator based on the position of the boom arm relative to the chassis.

7. The system of claim 6, wherein:
the boom arm is moveable relative to the chassis between an unfolded position and a folded position; and
the data generated by the sensor is further indicative of whether the boom arm is being moved to the unfolded position or the folded position.

8. The system of claim 7, wherein:
the railing is pivotable relative to the platform between an operational position and a stowed position; and
when controlling the operation of the actuator, the computing system is configured to control the operation of the actuator such that the railing is moved to the operational position when the boom arm is being moved to the unfolded position and the railing is moved to the stowed position when the boom arm is being moved to the folded position.

9. The system of claim 8, wherein the railing is biased to one of the operational position or the stowed position.

10. The system of claim 6, wherein the platform is positioned above a plurality of wheels of the agricultural sprayer in a vertical direction.

11. The system of claim 6, wherein:
the boom arm extends along a lateral direction from a first end of the boom arm to a second end of the boom arm, the lateral direction extending perpendicular to a travel direction of the agricultural sprayer; and
the platform is at least partially positioned between the cab and the railing in the lateral direction.

12. A method for controlling an operation of an agricultural sprayer, the agricultural sprayer including a boom arm and a plurality of nozzle assemblies supported on the boom arm, the agricultural sprayer further including a platform and a railing pivotably coupled to the platform, the method comprising:
receiving, with a computing system, sensor data of a position of the boom arm relative to a chassis of the agricultural sprayer;
determining, with the computing system, the position of the boom arm relative to the chassis based on the received sensor data; and
controlling, with the computing system, an operation of an actuator configured to pivot the railing relative to the platform based on the determined position of the boom arm relative to the chassis.

13. The method of claim 12, wherein:
the boom arm is moveable relative to the chassis between an unfolded position and a folded position; and
the sensor data is further indicative of whether the boom arm is being moved to the unfolded position or the folded position.

14. The method of claim 13, wherein:
the railing is pivotable relative to the platform between an operational position and a stowed position; and
controlling the operation of the actuator comprises controlling, with the computing system, the operation of the actuator such that the railing is moved to the operational position when the boom arm is being moved to the unfolded position and the railing is moved to the stowed position when the boom arm is being moved to the folded position.

* * * * *